United States Patent [19]
Adler et al.

[11] 3,761,921
[45] Sept. 25, 1973

[54] VIGILANCE TESTING AND WARNING APPARATUS

[75] Inventors: Karl Adler, Grenchen, Germany; George Ducommun, Feldbrunnen; Rene Jenni, La Neuveville, both of Switzerland

[73] Assignee: Biviatur S.A., Geneva, Switzerland

[22] Filed: Nov. 29, 1971

[21] Appl. No.: 202,941

Related U.S. Application Data

[63] Continuation of Ser. No. 852,558, Aug. 25, 1969, abandoned.

[30] Foreign Application Priority Data
Aug. 29, 1968 Switzerland.................... 13096/68

[52] U.S. Cl...................... 340/421, 340/331, 351/1
[51] Int. Cl............................................. A61b 3/00
[58] Field of Search.................. 340/331, 377, 384, 340/326, 421, 428 P, 279, 213 R; 128/1, 2.1; 351/1

[56] References Cited
UNITED STATES PATENTS
| | | | |
|---|---|---|---|
| 3,312,508 | 4/1967 | Keller et al. ................. | 340/279 UX |
| 3,316,902 | 5/1967 | Winchel et al.................. | 340/213 R |
| 3,424,519 | 1/1964 | White .................................... | 351/1 |

*Primary Examiner*—Thomas B. Habecker
*Attorney*—Dwight H. Smiley

[57] ABSTRACT

A vigilance testing and warning apparatus allowing a flicker - fusion test and comprising a flickering luminous indicator, means for adjusting the flicker frequency and means for producing an acoustical signal when the frequency falls below a limit value, this acoustical signal indicating that vigilance of the tested person is below an allowable level.

10 Claims, 5 Drawing Figures

Patented Sept. 25, 1973 3,761,921
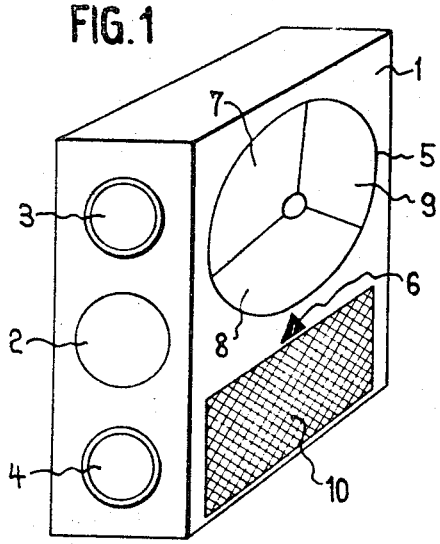
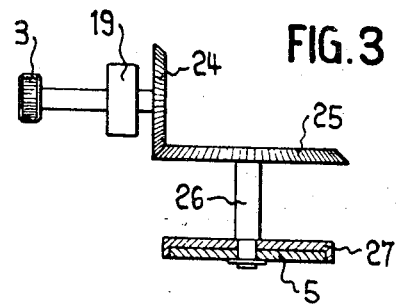
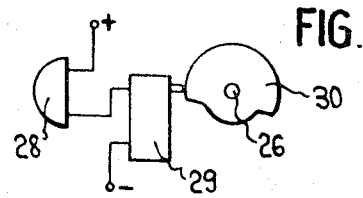
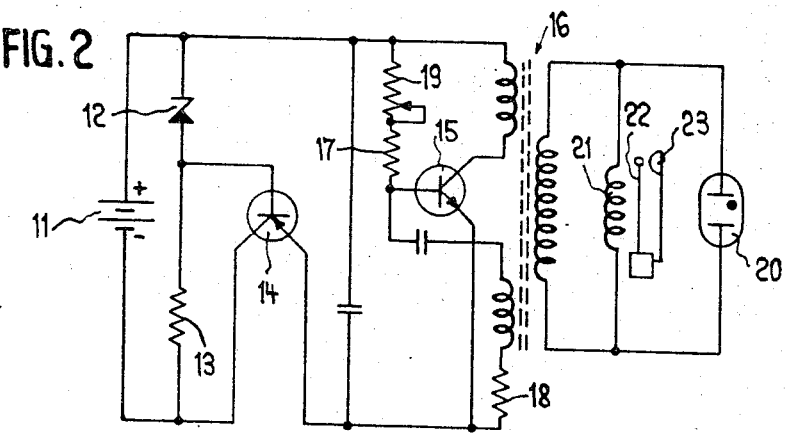
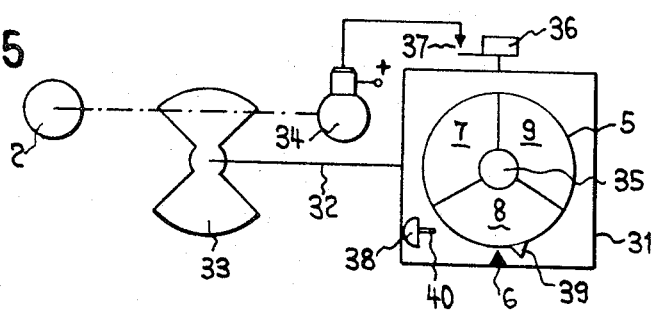
INVENTORS
KARL ADLER
GEORGE DUCOMMUN
RENE JENNI
Smiley & Smiley
Attys.

VIGILANCE TESTING AND WARNING APPARATUS

CROSS REFERENCE TO RELATED APPLICATION

This application is a continuation of application Ser. No. 852,558 filed Aug. 25, 1969, now abandoned.

This invention relates to a vigilance testing and warning apparatus having a flickering luminous indicator and means for varying the flickering frequency of the luminous indicator. Apparatus of this type are designed and used as laboratory equipment whereby the examining person, for instance a doctor, operates the apparatus and the tested person has only to observe when the indicator appears flickering. Therefore, prior apparatus are generally not suitable for personal private use.

It is an object of this invention to provide an apparatus for easily checking the personal vigilance of the user but at the same time allowing testing of a person by a supervising person, for instance a policemen. The apparatus according to this invention is characterized by acoustical warning means operable when the flickering frequency falls below a limit frequency. Therefore, when during adjustment of the flickering frequency of the luminous indicator this frequency decreases to or below said limit value which may be a value generally adopted for all persons to be tested or which may be individually associated to one particular owner of the device, an acoustical signal indicates this fact. The apparatus thus clearly indicates that the vigilance of the tested person is below a level allowing driving of a motor car as an example, it being impossible that the tested person might avoid this acoustical indication even when the apparatus is exclusively operated by that person. Preferably, an optical indicator, for instance a rotatable scale disc, may be located at an other side or surface of the apparatus than the luminous indicator such that the scale and luminous indicator cannot be observed simultaneously. Therefore, it is impossible in spite of the scale indicating the adjusted flickering frequency to cheat in the presence of a supervising person.

The accompanying drawing schematically illustrates, by way of example, an embodiment and modifications of the vigilance testing and warning apparatus according to this invention.

FIG. 1 is a perspective view of the embodiment,

FIG. 2 is an electrical diagram of the embodiment,

FIG. 3 shows some mechanical details of the embodiment and

FIGS. 4 and 5 are schematic illustrations of modifications.

The apparatus illustrated in FIGS. 1 – 4 has a casing 1 of such a small size, that it may easily be carried by a person, for instance in a coat pocket. A luminous indicator 2 at the one face of the casing may be energized from a multivibrator or similar oscillator accommodated in the casing, if necessary through an amplifier and pulse former stage. The flickering frequency of the luminous indicator may be adjusted by means of an actua-ting knob 3 and the brightness of the indicator may be adjusted by means of a knob 4. The operating knob 3 not only actuates a potentiometer or the like for adjustment of the frequency of the oscillator, but also an indicating disc 5 rotatably mounted above a reference mark 6. Preferably the indicating disc 5 is rotatably mounted on a disc-shaped rotatable carrier, such that by overcoming some friction the indicating disc may be adjusted relatively to its carrier. The indicating disc 5 is subdivided into ranges or zones 7 to 9 which may be of different colour. As an example for high frequencies and vigilance level respectively a green zone, for medium but sufficient vigilance level a yellow zone and for values below the limit frequency and corresponding to insufficient vigilance a red zone may be used. It is easily seen to which of the zones the mark 6 is directed thereby indicating the degree of vigilance of the tested person.

Behind a grid 10 the apparatus has an acoustical warning device, for instance a simple vibrating leaf spring or the like which is actuated when the flicker frequency decreases below said limit frequency, that is, when the red zone of the indicating disc 5 comes within reach of mark 6.

The limit frequency may be adjusted to a standard value, for instance 30 Hz for all users or it may be adjusted to an individually determined value for the person using the apparatus for testing the personal vigilance. The possibility of rotating the indicating disc 5 on its driving carrier allows adjustment and calibration of the apparatus in a simple manner.

Since the luminous indicator 2 and the indicating disc 5 are disposed on different sides of the apparatus it is impossible to attentively observe both indications simultaneously, so that it is impossible, particularly in the presence of a supervising person, to willingly adjust frequencies still corresponding to sufficient vigilance without really seeing flickering of the luminous indicator. In order to have even a clearer situation, the luminous indicator 2 and the indicating disc 5 may be located at opposite sides of the casing, for instance at the flat front and rear side thereof.

With reference to FIGS. 2 to 4 further details of the apparatus will now be explained. The apparatus has a battery 11 with a voltage of 9 V as an example. This voltage is stabilized to a substantially constant value independently of the age and voltage of the battery, by a stabilizing circuit comprising a Zener diode 12, a resistor 13 and a transistor 14. By the voltage divider formed by the Zener diode and resistor 13 the base voltage of transistor 14 is maintained at a constant value so that the operating voltage for the remaining parts of the apparatus is maintained at a constant value by transistor 14.

The apparatus comprises a blocking ocillator including a transistor 15, a feed-back transformer 16 for the same, biasing resistors 17 and 18 and an adjusting potentiometer 19. The frequency of the blocking oscillator may be adjusted by means of potentiometer 19. The secondary winding of the feed-back transformer 16 is connected to a gas discharge tube 20 by which the luminous indicator 2 is illuminated by pulses produced by the oscillator. A driving coil 21 connected in parallel with tube 20 energizes a spring lamella 22 of which the resonance frequency is adjusted to a suitable frequency, e.g., between 30 and 40 Hz. A weight at the free end of lamella 22 operates a bell 23 when its amplitude is sufficient, this being the case when the frequency of the blocking oscillator and the flickering frequency of the luminous indicator 2 respectively is equal or substantially equal to the resonance frequency of lamella 22. The bell 23 is located behind grid 10 and produces said acoustical signal when the flicker frequency falls to a predetermined value at or near the resonance frequency of lamella 22. The resonance frequency of lamella 22 may also be adjusted to a multiple of the limit flicker frequency.

FIG. 3 schematically illustrates the very simple mechanism of the apparatus. The shaft of potentiometer 3 carries at one end the actuating knob 3 and at its other end a bevel gear 24 meshing with another bevel gear 25. Bevel gear 25 is mounted on a shaft 26 on which is further mounted a disc-shaped rotatable carrier 27 on which disc or dial 5 is supported with some friction in such a manner, that it usually rotates together with carrier disc 27, but may be adjusted relatively to disc 27 by overcoming the friction between parts 5 and 27.

In the modification illustrated in FIG. 4 the acoustical warning device formed by coil 21, lamella 22 and bell 23 in the embodiment shown in FIGS. 1 to 3 is replaced by a buzzer 28 series connected with a microswitch 29 operable by a cam disc 30 mounted on shaft 26. As long as the adjusted frequency is above the limit frequency, switch 29 is maintained open by cam 30 and the buzzer 28 is inoperative. As soon as the flicker frequency is adjusted to values at or below the limit frequency, the cam 30 allows closure of switch 29 and the buzzer is energized and produces the warning signal.

In a modified embodiment a spring-driven rotating diaphragm may be disposed between a light source and the luminous indicator instead of providing an electronic oscillator. The diaphragm may be controlled by a continuously adjustable governor and may thus be driven at an adjustable speed or frequency respectively indicated by disc 5 which is coupled with the adjusting mechanism of the governor. The spring may be rewound for each use of the apparatus by pressure against a rewinding lever, whereby the light source is also switched on for a limited duration sufficient for a normal vigilance test. The acoustical warning device may be switched on when the flickering frequency decreases below the limit frequency, or it may be coupled with the governor or with the diaphragm in such a way that it is actuated when the frequency falls to or below limit frequency.

In this modified embodiment or in the embodiment described above and illustrated in the drawing the flickering frequency may decrease automatically from relatively high initial values, for instance in accordance with the running down of the driving spring, the momentary frequency being thereby continuously indicated. When the tested person first notices flickering of the luminous indicator, the apparatus is stopped by pressure upon a stop button or key, whereby the frequency meter or indicator 5 is stopped in the position it has reached during operation of the apparatus and thus indicates the vigilance. If the stop button or key is only actuated when the flickering frequency has already decreased to or below the limit frequency, the acoustical warning signal sounds.

A modified embodiment of this type is schematically illustrated in FIG. 5. This apparatus has a spring motor 31 having an output shaft 32 carrying an obturator or diaphragm 33 of which the wings alternatively pass through the path of a light beam from an incandescent bulb 34 to the luminous indicator 2. The spring motor may be rewound by approximately one revolution of a knob 35. The indicating disc 5 is mounted on the winding shaft together with knob 35 but disc 5 may be adjustable on the shaft as shown in FIG. 3. The spring motor has a stop button 36 which is automatically released from its lower stop position as indicated into an upper inoperative position when the motor is rewound. As schematically shown in FIG. 5, knob 36 actuates a switch 37 open when the knob is in its lower operative stop position and closed when the knob is in its inoperative upper position, this switch being connected into the circuit of bulb 34. The spring motor 31 has a bell 38 which may be actuated by pressure of a cam 39 of disc 5 against a pin 40 of bell 38. The necessary actuating mechanisms schematically illustrated in FIG. 5 are well known for instance in alarm clocks, where a stop button is automatically released when the spring is wound and the gear train and bell are stopped when the button is pressed down. Equally, release mechanisms for the bell mechanisms are well known in alarm clocks.

For use of the apparatus shown in FIG. 5, the operator rewinds the motor 31 by rotation of the knob 35 and disc 5 to an end position corresponding to highest frequency. By this movement, stop button 36 is automatically released into its upper inoperative position. Switch 37 is thereby closed and bulb 34 is energized and illuminates indicator 2. When the winding knob 35 is released the motor 31 starts to run down first at a relatively high speed due to the full winding of the spring. The rotating obrutator 33 interrupts the light beam of bulb 34 at a high frequency well above the limit frequency. Due to the decrease in spring torque the speed of shaft 32 and the flickering frequency gradually decrease, the mechanism being so designed that the position of disc 5 which slowly turns back always corresponds to the flickering frequency. When the operator first observes flickering of the indicator, he presses down button 36 and thereby stops running down of motor 31 and dial 5 and switches off bulb 34. He may then read the frequency at which he first observed flickering, this being a measure for his vigilance. When button 36 is not pressed down before the limit frequency is reached cam 39 releases the mechanism operating bell 38 which produces the warning signal. The operator may then stop the apparatus. For another use of the apparatus it is sufficient to rewind it as described and to release the winding knob for another test.

Similar automatic operation may be provided in the apparatus disclosed in FIGS. 1 to 3 by slowly rotating potentiometer 19 by means of a small motor which is shut down as soon as flickering of the luminous indicator is observed. The potentiometer 19 and dial 5 would manually be reset into initial position at the end of each test by overcoming friction of a friction clutch inserted between the motor and potentiometer shaft.

What we claim is;
1. Apparatus for testing observer vigilance and warning of inadequacy of response, comprising in combination:
   illuminatable indicator means;
   adjustable flicker producing means for providing intermittent flickering of said indicator means at the point of observation:
   observer-activated control means connected to said adjustable flicker producing means, for varying the flickering frequency to a point enabling detection of flickering by said observer;
   acoustical warning means interconnected with said control means, said warning means being operative to provide an acoustical signal upon said flickering frequency falling below a preselected limit frequency, whereby to provide a positive audible warning indication upon said observer's ability to detect flickering falling below said limit frequency;

said illuminatable means comprising a glow lamp, and said flicker producing means comprising an oscillator circuit connected to intermittently drive said lamp, said control means being connected to adjust the frequency of said output, and supervising means for regulating the operating voltage to said oscillating circuit and for switching off the apparatus when the operating voltage falls below a lower limit value.

2. Apparatus for testing observer vigilance and warning of inadequacy of response, comprising in combination:

illuminatable indicator means;

adjustable flicker producing means for providing intermittent flickering of said indicator means at the point of observation;

observer-activated control means connected to said adjustable flicker producing means, for varying the flickering frequency to a point enabling detection of flickering by said observer; and acoustical warning means interconnected with said control means, said warning means being operative to provide an acoustical signal upon said flickering frequency falling below a preselected limit frequency, whereby to provide a positive audible warning indication upon said observer's ability to detect flickering falling below said limit frequency.

3. Apparatus according to claim 2, further including a casing, said illuminatable indicator means disposed at one side of said casing, and a visual indicator of frequency of flicker, said visual indicator being disposed at a side of said casing other than that bearing said illuminatable indicator mens, whereby to preclude knowledge by the observer of his response to vigilance testing.

4. Apparatus according to claim 2, wherein said illuminatable means comprises a glow lamp, and said flicker producing means comprises an oscillator circuit connected to intermittently drive said lamp, said control means being connected to adjust the frequcncy of said oscillator output.

5. Apparatus according to claim 2, wherein said flicker producing means comprises a spring driven rotatable disphragm of which the speed is adjustable, said diaphragm being located between a light source and said illuminatable indicator means, for chopping the light beam incident on siad indicator.

6. Apparatus for testing observer vigilance and warning of inadequacy of responce, comprising in combination:

illuminatable indicator means;

adjustable flicker producing means for providing intermittent flickering of said indicator means at the point of observation.

observer-activated control means connected to said adjustable flicker producing means, for varying the flickering frequency to a point enabling detection of flickering by said observer;

acoustical warning means intercnnected with said control means, said warning means being operative to provide an acoustical signal upon said flickering frequency falling below a preselected limit frequency, whereby to provide a positive audible warning indication upon said observer's ability to detect flickering falling below said limit frequency; a casing, said illuminatable indicator means disposed at one side of said casing, and a visual indicator of frequency of flicker disposed at a side of said casing other than that bearing said illuminatable indicator means, whereby to preclude knowledge by the observer of his response to vigilance testing; and said visual indicator comprising an indicator disc operatively coupled with said control means, said disc being subdivided into ranges corresponding to different degress of vigilance.

7. Apparatus according to claim 6, wherein said indicator disc is rotatably and adjustably mounted with respect to said operator-activated control means.

8. An apparatus according to claim 7, wherein said indicator disc is mounted on a carrier disc.

9. Apparatus for testing observer vigilance and warning of inadequacy of response, comprising in combination:

illuminatable indicator means;

adjustable flicker producing means for providing intermittent flickering of said indicator means at the point of observation;

observer-activated control means connected to said adjustable flicker producing means, for varying the flickering frequency to a point enabling detection of flickering by said observer;

acoustical warning means interconnected with said control means, said warning means being operative to provide an acoustical signal upon said flickering frequency falling below a preselected limit frequency, whereby to provide a positive audible warning indication upon said observer's ability to detect flickering falling below said limit frequency;

said illuminatable means comprising a glow lamp, and said flicker producing means comprising an oscillator circuit connected to intermittently drive said lamp, said control means being connected to adjust the frequency of said oscillator output, and said warning means comprising an electromechanical resonator transformer-coupled to said oscillator output, said resonator having a natural frequency which is an integral multiple of said limit frequency.

10. Apparatus for testing observer vigilance and warning of inadequacy of response, comprising in combination:

illuminatable indicator means; adjustable flicker producing means for providing intermittent flickering of said indicator means at the point of observation;

observer-activated control means connected to said adjustable flicker producing means, for varying the flickering frequency to a point enabling detection of flickering by said observer; acoustical warning means;

switch means operable by actuating means interconnected with said control means for closing said switch means upon adjustment of said control means to positions controlling a flickering frequency below a preselected limit frequency and connected to said switch means and being operative to provide an acoustical signal upon said flickering frequency falling below said preselected limit frequency, whereby to provide a positive audible warning indication upon said observer's inability to detect flickering above said limit frequency.

* * * * *